United States Patent
Levinbook et al.

(10) Patent No.: US 11,277,291 B2
(45) Date of Patent: Mar. 15, 2022

(54) METHOD, APPARATUS, AND DEVICE FOR DETERMINING PHASE TRACKING REFERENCE SIGNAL RESOURCE LOCATION

(71) Applicant: HUAWEI TECHNOLOGIES CO., LTD., Shenzhen (CN)

(72) Inventors: Yoav Levinbook, Hod Hasharon (IL); Ezer Melzer, Hod Hasharon (IL); Doron Ezri, Hod Hasharon (IL); Minghui Xu, Chengdu (CN); Xi Zhang, Ottawa (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/875,781

(22) Filed: May 15, 2020

(65) Prior Publication Data
US 2020/0280473 A1   Sep. 3, 2020

Related U.S. Application Data (63) Continuation of application No. PCT/EP2017/079689, filed on Nov. 17, 2017.

(51) Int. Cl.
*H04L 27/26* (2006.01)
*H04L 5/00* (2006.01)

(52) U.S. Cl.
CPC ........ *H04L 27/2613* (2013.01); *H04L 5/0051* (2013.01); *H04L 27/2636* (2013.01)

(58) Field of Classification Search
CPC .............. H04L 27/2613; H04L 5/0051; H04L 27/2636
See application file for complete search history.

(56) References Cited

U.S. PATENT DOCUMENTS

2018/0091350 A1 * 3/2018 Akkarakaran ........ H04L 5/0053

FOREIGN PATENT DOCUMENTS

| CN | 105122871 A | 12/2015 | |
|---|---|---|---|
| CN | 107211456 A | 9/2017 | |
| WO | WO-2009044256 A1 * | 4/2009 | ......... H04L 27/2601 |
| WO | 2017188591 A1 | 11/2017 | |
| WO | WO 2018/064313 A1 * | 4/2018 | ........... H04L 5/0048 |

OTHER PUBLICATIONS

R1-1712266 "PTRS insertion methods and patterns of UL DFT-sOFDM waveform" by Mitsubishi Electric, 3GPP TSG-RAN WG1 #90 Prague. Czech Republic Aug. 21-25, 2017.*

(Continued)

*Primary Examiner* — Sophia Vlahos
(74) *Attorney, Agent, or Firm* — Leydig, Voit & Mayer, Ltd.

(57) ABSTRACT

An apparatus for constructing a pre-DFT sample sequence for an OFDM-signal is provided. The apparatus comprises: a processor configured to construct a pre-DFT sample sequence with a pre-defined length such that it comprises data; and a PTRS-group, wherein the last sample of the PTRS-group is placed within the pre-DFT sample sequence at a pre-defined position located B samples before the end of the pre-DFT sample sequence.

8 Claims, 5 Drawing Sheets

(56) References Cited

OTHER PUBLICATIONS

"Discussion on PT-RS design," 3GPP TSG RAN WG1 Meeting 90bis, Prague, CZ, R1-1717882, XP51341066AI, pp. 1-10, 3rd Generation Partnership Project, Valbonne, France (Oct. 9-13, 2017).
"3rd Generation Partnership Project; Technical Specification Group Radio Access Network; NR; Physical channels and modulation (Release 15)," 3GPP TS 38.211 V1.0.0, pp. 1-37, 3rd Generation Partnership Project, Valbonne, France (Sep. 2017).
"On chunk-based PTRS for UL DFTsOFDM waveform," 3GPP TSG-RAN WG1 #90b, Prague, Czech Republic, R1-1717760, XP51352499AI, pp. 1-13, 3rd Generation Partnership Project, Valbonne, France (Oct. 9-13, 2017).
"Phase noise model for above 6 GHz," 3GPP TSG RAN WG1 Meeting #85, Nanjing, China, R1-164041, pp. 1-6, 3rd Generation Partnership Project, Valbonne, France (May 23-27, 2016).
Huawei, HiSilicon, "Further details of PTRS," 3GPP TSG RAN WG1 Meeting #90bis, Prague, Czech Republic, R1-1717306, total 13 pages, 3rd Generation Partnership Project, Valbonne, France (Oct. 9-13, 2017).
Ericsson, "Design considerations for phase noise tracking RS (PTRS)," 3GPP TSG-RAN WG1 #87, Reno, USA, R1-1612333, total 4 pages, 3rd Generation Partnership Project, Valbonne, France (Nov. 14-18, 2016).
Mitsubishi Electric, "On phase and frequency tracking for DFTsOFDM," 3GPP TSG-RAN WG1 #88b, R1-1704656, total 5 pages, 3rd Generation Partnership Project, Valbonne, France (Apr. 3-7, 2017).

\* cited by examiner

METHOD, APPARATUS, AND DEVICE FOR DETERMINING PHASE TRACKING REFERENCE SIGNAL RESOURCE LOCATION

CROSS-REFERENCE TO RELATED APPLICATIONS

This application is a continuation of International Application No. PCT/EP2017/079689, filed on Nov. 17, 2017, the disclosure of which is hereby incorporated by reference in its entirety.

TECHNICAL FIELD

Embodiments of the present invention relate to wireless communications technologies, and in particular, to a method for determining a phase tracking reference signal resource (PTRS) resource location.

BACKGROUND

Next-generation wireless networks will need to provide higher throughput to support greater numbers of subscribers as well as applications requiring higher data rates. For the purpose above, due to limited spectrum availability, the system bands are moved to higher frequencies, for instance above 6 GHz. However, the higher the deployed frequency band is, the higher is the instability of the radio frequency (RF) components involved in the system implementation.

As a result, wireless communication systems at RF bands above 6 GHz must cope with high levels of phase noise (PN or PHN), which should be treated as part of the design of the system's air-interface and not be left only as an implementation issue. In order to ensure high performance of the communication links, phase tracking reference signal (PTRS), is introduced into the design of the physical layer of next-generation communication systems.

In the case of discrete Fourier transform-spread orthogonal frequency division multiplexing (DFT-S-OFDM), waveform of next-generation communication systems such as 3GPP New Radio (NR), the PTRS consists of groups (also sets, blocks, or chunks) of pre-defined QAM symbols which are inserted into the waveform at certain resource locations according to a pre-defined pattern in the pre-DFT time domain (TD). When the transmit apparatus sends the PTRS as part of the whole waveform signal, the receive apparatus demodulates the PTRS symbols based on their pre-defined pattern and values, and thus exploits the PTRS to perform PN tracking and compensation, namely estimate the PN accompanying the data symbols and enhance the detection of the received signal, enabling a more reliable reconstruction of the transmitted data. If one of the PTRS groups is located in the pre-DFT domain at the last several samples of a set of contiguous samples comprising the DFT input for an OFDM symbol, i.e., the last PTRS group is located at the tail of an OFDM symbol, a problem may arise which degrades the capability of the receiver to perform PN tracking and compensation, thus degrading the overall link performance.

SUMMARY

Embodiments of the present invention provide a data transmission method, implemented within a user equipment (UE), and/or a base station, which are used for constructing a pre-DFT sample sequence of an OFDM-signal, or acquiring a post-IDFT sample sequence of an OFDM-signal.

According to a first aspect, an embodiment of the present invention provides an apparatus for constructing a pre-DFT sample sequence for an OFDM-signal, comprising: a processor configured to construct a pre-DFT sample sequence with a pre-defined length such that it comprises data; and a PTRS-group, wherein the last sample of the PTRS-group is placed within the pre-DFT sample sequence at a pre-defined position located B samples before the end of the pre-DFT sample sequence.

In a first possible implementation manner of the first aspect, the number of PTRS-groups is larger than one.

In a second possible implementation manner of the first aspect, the number of PTRS-groups is larger than two and the PTRS-groups are arranged with an equal spacing within the pre-DFT sample sequence. In a possible aspect, the number of PTRS-groups is larger than two and the PTRS-groups are arranged with an approximately equal spacing within the pre-DFT sample sequence. Thus, the second possible implementation guarantees that the PTRS-groups are arranged exactly or almost uniformly in the pre-DFT sample sequence, making the PN estimation at the receiver more accurate and simpler to implement and requiring lower complexity processing. In other words, the second possible implementation enables an efficient intra-symbol PN interpolation with a single linear interpolation filter, over PTRS groups which are placed uniformly within an OFDM symbol.

In a third possible implementation manner of the first aspect, the value of B is smaller than a pre-defined value B1 and greater than a pre-defined value B2. Thus, the last PTRS-group is placed near the end of the pre-DFT sample sequence, and the first PTRS-group is placed possibly near the beginning of the pre-DFT sample set. Phase noise is more accurately estimated in the third possible implementation also by keeping the extrapolation interval(s) at the OFDM symbol edge(s) short with respect to the interpolation intervals between consecutive PTRS-groups, when only intra-symbol interpolation is assumed to be used for PN tracking.

In a fourth possible implementation manner of the first aspect, the value of B is larger than $\frac{1}{250}$ times the size of the pre-DFT sample sequence and smaller than $\frac{1}{4}$ times the size of the pre-DFT sample sequence.

In a fourth possible implementation manner of the first aspect, the apparatus is configured to construct at least two consecutive pre-DFT sample sequences, used for generating two consecutive OFDM symbols of the OFDM-signal, wherein at least one, in particular two, is having a PTRS-group placed at a pre-defined position located B samples before the end of the respective pre-DFT sample sequence. The fourth implementation enables improved PN estimation and compensation at the receiver by allowing inter-symbol interpolation across boundaries between consecutive OFDM symbols of the received OFDM signal.

According to a second aspect, a receive apparatus for acquiring a post-IDFT sample sequence of an OFDM-signal, comprising: a processor, configured to acquire a post-IDFT sample sequence with a pre-defined length and extract: data and a PTRS-group, wherein the post-IDFT sample sequence is shifted in post-IDFT TD or alternatively and equivalently in pre-IDFT frequency domain (FD), by a distance smaller or equal than B post-IDFT samples relative to the pre-DFT sample sequence generated at the transmitter which transmitted the OFDM-signal to the receiver. Thus, no wrapping-around of the last PTRS-group within the post-IDFT sample sequence from the end to the beginning of the sample sequence occurs.

In a first possible implementation manner of the second aspect, the processor is further configured to extract at least two PTRS-groups from a post-IDFT sample sequence acquired from a received OFDM signal.

In a second possible implementation manner of the second aspect, the processor is further configured to extract at least two PTRS-groups, wherein these PTRS-groups are arranged with an equal spacing within the post-IDFT sample sequence. In a possible aspect, the number of PTRS-groups is larger than two and the PTRS-groups are arranged with an approximately equal spacing within the pre-DFT sample sequence. This aspect, guaranteeing the PTRS-groups are arranged exactly or almost uniformly in the post-IDFT sample sequence, enables a more accurate PN estimation process and a more efficient implementation of an intra-symbol PN interpolation with a single linear interpolation filter, over PTRS-groups which are placed within an OFDM symbol.

In a third possible implementation manner of the second aspect, B is smaller than a pre-defined value B1 and greater than a predefined value B2. Thus the last PTRS-group is placed near the end of post-IDFT sample sequence. Thus a relatively short extrapolation interval is required at the end of the OFDM symbol, and PN estimation and tracking is more accurate.

In a fourth possible implementation manner of the second aspect, the processor is further configured to acquire another post-IDFT sample sequence of an OFDM-signal, wherein at least one PTRS-group is used to estimate PN and data of the another post-IDFT sample sequence; and/or wherein at least one PTRS-group from the another post-IDFT sample sequence is used to estimate PN and the data. As a result, phase noise is more accurately estimated and the data is more reliably detected.

In a fifth possible implementation manner of the second aspect, the value of B is larger than $\frac{1}{250}$ times the size of the pre-DFT sample sequence and smaller than $\frac{1}{4}$ times the size of the pre-DFT sample sequence.

According to a third aspect, an embodiment of the present invention provides a method for constructing a pre-DFT sample sequence for an OFDM-signal, comprising: constructing, by a user equipment, UE, a pre-DFT sample sequence with a pre-defined length such that it comprises: data; and a PTRS-group, wherein the last sample of the PTRS-group is placed within the pre-DFT sample sequence at a pre-defined position located B samples before the end of the pre-DFT sample sequence.

According to a fourth aspect, an embodiment of the present invention provides an apparatus for acquiring a post-IDFT sample sequence of an OFDM-signal, comprising: acquiring, by a base station, a post-IDFT sample sequence with a pre-defined length; extracting, by the base station, data and a PTRS-group, wherein the post-IDFT sample sequence is shifted in post-IDFT TD or alternatively and equivalently in pre-IDFT FD by a distance smaller or equal than B post-IDFT samples relative to the pre-DFT sample sequence generated at the UE which transmitted the OFDM-signal to the base station.

The provided methods and apparatuses ensure the receiver demodulates the PTRS in its correct place. Receiver timing offsets no longer affect the phase noise estimation process performed by the receiver, and measurement, estimation and tracking of phase noise become more accurate and effective, thus subsequently improving the performance of the wireless communication system.

BRIEF DESCRIPTION OF DRAWINGS

To describe the technical solutions in the embodiments of the present invention or in the prior art more clearly, the following briefly introduces the accompanying drawings required for describing the embodiments or the prior art. Apparently, the accompanying drawings in the following description show some embodiments of the present invention, and persons of ordinary skill in the art may still derive other drawings from these accompanying drawings without creative efforts.

DESCRIPTION OF EMBODIMENTS

To describe the technical solutions in the embodiments of the present invention or in the prior art more clearly, the following briefly introduces the accompanying drawings required for describing the embodiments or the prior art. Apparently, the accompanying drawings in the following description show some embodiments of the present invention, and persons of ordinary skill in the art may still derive other drawings from these accompanying drawings without creative efforts.

Figure 1:
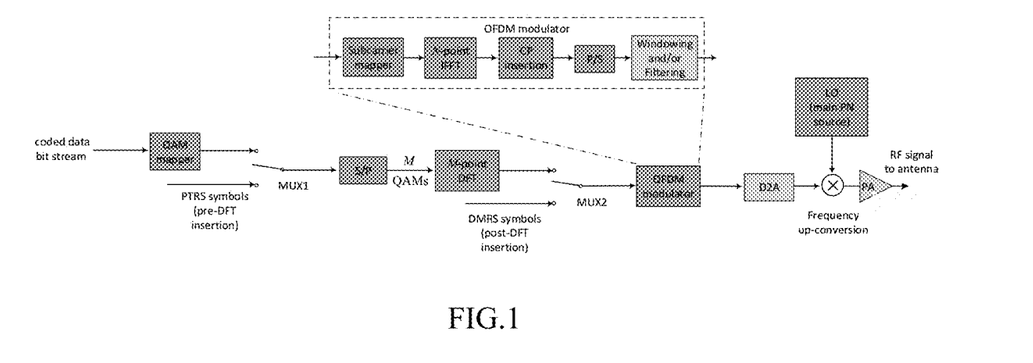
FIG. 1 is a flowchart of a transmit apparatus transmitting an OFDM signal.

FIG. 1 is a flow chart of a transmit apparatus for transmitting an OFDM signal. Before the signal transmission from the transmitter to a receiver through an air interface, the transmitter may preform several steps. In the present embodiment, the transmit apparatus may be a user equipment (UE), terminal, cell phone, or mobile phone, etc., and correspondingly, the receive apparatus may be a base station, e-Node B, or g-Node B, etc. If the transmit apparatus is a base station, e-Node B, or g-Node B, etc., the receive apparatus may be a UE, terminal, cell phone, or mobile phone, etc.

In a DFT-S-OFDM waveform, the transmitter may determine or generate a sequence of contiguous samples in the pre-discrete Fourier transform time domain, pre-DFT TD. The sequence of contiguous samples may be in a form of an ordered set, an array, or a vector, etc. Each sample is associated with an element or an item of the sequence, array, or vector, etc. or the sequence of the contiguous samples may be a series of units, and each unit contains one or more values or numbers, each sample is associated with a unit. We shall henceforth occasionally refer to the above sequence of contiguous samples interchangeably as the "pre-DFT sample sequence" or the "DFT input vector", and the sequence length will be denoted by M.

In order to enable estimation of the phase noise (PN), at the receiver, a PTRS is included in the DFT-S-OFDM waveform generated by the transmitter. The PTRS may be located in several samples of the set of contiguous samples, namely occupy certain elements of the DFT input vector. In one embodiment, the PTRS may be divided into X PTRS groups (or blocks, or sets) of PTRS samples, where X is a positive integer. As another embodiment, all of the PTRS sets contain the same number K of PTRS elements each, where K is a positive integer. In the above embodiment, each PTRS group of K samples occupies a separate set of K contiguous disjoint elements of the DFT input vector, with one or more non-PTRS samples located between consecutive PTRS groups along the DFT input vector. A PTRS group in the above embodiment may also be called a "PTRS chunk". There are X PTRS groups in the DFT input vector, where each PTRS group is of size K. i.e., there is a total of X·K PTRS samples located within the M samples of the DFT input vector.

After placing the PTRS samples at the locations of the PTRS groups in the DFT input vector, and possibly placing data samples at the remaining sample locations along the DFT input vector, the transmit apparatus maps the DFT input vector onto an OFDM symbol via a DFT operation. In some embodiments, the DFT may be implemented by some alternative algorithm like fast Fourier transform, FFT, or other appropriate time-frequency transformation. Then the transmit apparatus will further process the signal and transmit it to the receiver. As an embodiment, the process above, may also be implemented by some other algorithm like time domain expansion, etc., and then the transmit apparatus sends the processed signal to the receive apparatus.

Following the transmit apparatus operation, the receive apparatus receives the processed OFDM signal, and performs demodulation including an Inverse DFT, IDFT, operation whose output will be referred to as a "post-IDFT sample sequence", from which the receiver attempts to reconstruct the pre-DFT sample sequence which was originally generated by the transmit apparatus in the pre-DFT TD. The receive apparatus may perform PN estimation based on the received PTRS samples whose values and locations within the post-IDFT sample sequence are a-priori known to both transmit and receive apparatuses. In an embodiment, interpolation and extrapolation algorithms in TD may be employed by the receiver, in order to estimate the PN all along the time axis aligned with the post-IDFT samples, particularly at the locations of the received data samples whose values may be a-priori unknown to the receiver, in order to be able to extract the information they carry more reliably.

Figure 2:
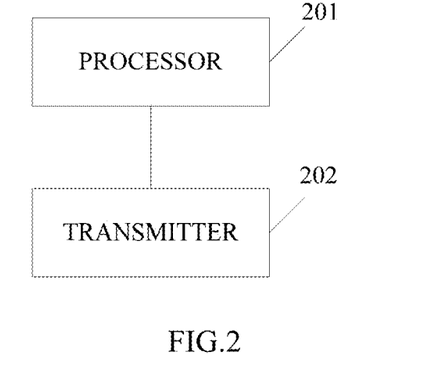
FIG. 2 is a structural diagram of an apparatus for the present invention.

FIG. 2 shows a structure of apparatus for constructing a pre-DFT sample sequence for an OFDM-signal, comprising:

Processor 201, configured to:

Construct a pre-DFT sample sequence with a pre-defined length such that it comprises: data; and a PTRS-group, wherein the last sample of the PTRS-group is placed within the pre-DFT sample sequence at a pre-defined position located B samples before the end of the pre-DFT sample sequence.

The pre-DFT sample sequence may be used as a basis for the OFDM-signal that is intended for transmission to a receiver. Any OFDM modulation may apply. Therefore, the pre-DFT sample sequence may be in particular processed by a Fourier transformation, in particular a DFT, and an OFDM modulation.

As an embodiment, the processor constructing a pre-DFT sample sequence may comprise a method determining the location of the PTRS groups in the pre-DFT sample sequence and then determining the PTRS in the PTRS groups and data, or a method determining the PTRS and data first and then determining their location, or other methods in other orders, or simultaneously determining them.

As described above, the pre-DFT sample sequence may be in a form of a sequence, array, or vector, or other forms of ordered number groups. A PTRS group may be a group of PRTS samples, which contains the PTRS. For example, if the pre-DFT sample sequence is of length M, there are M pre-DFT samples (or elements): sample 0, sample 1, . . . , sample M−1. The PTRS group may be located within some of the samples indexed 0 to M−1. If the number of PTRS groups is X, there are X PTRS groups: group 0, group 1, . . . , group X−1. If the PTRS group size K is equal to 1, each one of these X PTRS groups is located within (or occupies) one sample of the pre-DFT sample sequence. Or, if the PTRS group size K is equal to 2, each one of these X PTRS groups is located within 2 contiguous samples of the pre-DFT sample sequence. In an embodiment, any two of these PTRS groups are not overlapped, and in another embodiment, there is at least one sample between the PTRS groups along the pre-DFT sample sequence in which PTRS is not located. It shall be noted in the present application, that the counting or indexing of the X PTRS groups, and K PTRS samples in each PTRS group, or other counting parameters, starts from 0. In another embodiment, not all of the PTRS groups are of the same size.

In an embodiment, the last sample of the PTRS group is the sample which is located closest to the end of the sequence among all the samples in which PTRS groups are located. Or, in other words, the last sample is the sample at the end of the last PTRS group, the last PTRS group being the group closest to the end of the pre-DFT sample sequence out of all PTRS groups. If we denote the locations within the pre-DFT sample sequence of all the KX PTRS samples in all PTRS groups as $S_0$ to $S_{KX-1}$, like $S_0, S_1, S_2 \ldots S_{KX-1}$, and for any integer n between 0 and KX−2 the location $S_n$ is smaller than $S_{n+1}$, then the last sample of the last PTRS group is located at $S_{KX-1}$.

The end of the pre-DFT sample sequence can be the last sample of the pre-DFT sample sequence. In an embodiment, the last sample of the last PTRS group, or any part of the last sample of the PTRS group is not located within the last sample of the pre-DFT sample sequence.

The value of B is related to a time interval of a respective OFDM signal. But, strictly speaking, at the pre-DFT stage it does not represent an actual time yet; rather, the samples in the pre-DFT sample sequence are ordered in one on one correspondence with time ticks along the transmitted (and received) signal time axis, where the distance between consecutive ticks is equal to the net OFDM symbol duration divided by M (where M is the size of the pre-DFT sample sequence).

Clearly, the offset parameter B is related to a positive time interval. The quasi time difference B can be pre-defined by providing an exact position or a statistical distribution or an upper bound and/or a lower bound, wherein these bounds can also be either exact or defined statistically. The value of B is a positive integer. It shall be noted that a PTRS group contains at least one PTRS sample or a part of a PTRS signal. In another embodiment, B is related, when translated into absolute time, to some fraction (between 0 and 1) of the CP duration of an OFDM symbol of the OFDM signal.

In another embodiment, the number of PTRS-groups is larger than one. In another embodiment, then the last sample of the last PTRS-group is placed within the pre-DFT sample sequence at a pre-defined position located B samples before the end of the pre-DFT sample sequence.

The more PTRS groups in a pre-DFT sample sequence, the more accuracy in PN estimation or measurements by the receiver may be achieved. However, too many PTRS groups also may waste resources. As a result, the location of the PTRS groups shall be constructed or determined to increase the efficiently of PN estimation. In another embodiment, the number of PTRS-groups is larger than two and the PTRS-groups are arranged with an equal spacing within the pre-DFT sample set. "Equal spacing" here means that the numbers of samples between pairs of consecutive PTRS groups are all the same, up to possible differences which are smaller or equal to the largest PTRS-group size.

For example, example 1: four PTRS groups are constructed: Group0, Group1, Group2, and Group3. When the group size K is 2, and Group0 is located within $S_a$, $S_{a+1}$, which are the $a^{th}$ and the $a+1^{th}$ samples of the pre-DFT sample sequence, Group1 is located within $S_b$, $S_{b+1}$, which are the $b^{th}$ and the $b+1^{th}$ samples of the pre-DFT sample sequence, Group2 is located within $S_c$, $S_{c+1}$, which are the $c^{th}$ and the $c+1^{th}$ samples of the pre-DFT sample sequence, Group3 is located within $S_d$, $S_{d+1}$, which are the $d^{th}$ and the $d+1^{th}$ samples of the pre-DFT sample sequence, and a<b<c<d, then if the a, b, c and d satisfy the relations b−(a+1)=c−(b+1)=d−(c+1), then the PTRS groups are arranged with equal spacing within the pre-DFT sample sequence. In an embodiment, if Group0 is located within $S_0$, $S_1$, which are the first and the second samples of the pre-DFT sample sequence, the a, b, c and d satisfy b−(0+1)=c−(b+1)=d−(c+1).

If not all of the PTRS groups are of the same size, for another example, example 2: four PTRS groups are constructed: Group0, Group1, Group2, and Group3, and Group0 is located within $S_a$, $S_{a+1}$, $S_{a+2}$, which are the $a^{th}$, the $a+1^{th}$, and the $a+2^{th}$ samples of the pre-DFT sample sequence, Group1 is located within $S_b$, $S_{b+1}$, which are the $b^{th}$ and the $b+1^{th}$ samples of the pre-DFT sample sequence, Group2 is located within $S_c$, which is the $c^{th}$ sample of the pre-DFT sample sequence, Group3 is located within $S_d$, $S_{d+1}$, which are the $d^{th}$ and the $d+1^{th}$ sample of the pre-DFT sample sequence and a<b<c<d, then for being arranged equally spaced with the pre-DFT sample sequence the a, b, and c and d should further satisfy the relations b−(a+2)=c−(b+1)=d−c.

Also, the above embodiment may be combined with another embodiment of the processor 201. In example 1, because the PTRS group size is 2, the second sample of Group3 is the last PTRS sample within the pre-DFT sample sequence, and it is located at $S_{d+1}$ satisfying $S_{d+1}$<M−B, so that it is not placed within the last B samples of the pre-DFT sample sequence.

Similarly like in example 1, in example 2, $S_{d+1}$ satisfies $S_{d+1}$<M−B. The above embodiment may also be a single embodiment. A processor 201' configured to: construct a pre-DFT sample sequence with a pre-defined length such that it comprises data; and a PTRS-group, the number of PTRS-groups is larger than two and the PTRS-groups are arranged with an equal spacing within the pre-DFT sample set.

In another embodiment, the number of PTRS-groups is larger than two and the PTRS-groups are arranged with an equal spacing of start samples of each group within the pre-DFT sample set.

For example, example 3: four PTRS groups are constructed: Group0, Group1, Group2, and Group3. When the PTRS group size K is 2, and Group0 is located within $S_a$, $S_{a+1}$, which are the $a^{th}$ and the $a+1^{th}$ samples of the pre-DFT sample sequence, Group1 is located within $S_b$, $S_{b+1}$, which are the $b^{th}$ and the $b+1^{th}$ samples of the pre-DFT sample sequence, Group2 is located within $S_c$, $S_{c+1}$, which are the $c^{th}$ and the $c+1^{th}$ samples of the pre-DFT sample sequence, Group3 is located within $S_d$, $S_{d+1}$, which are the $d^{th}$ and the $d+1^{th}$ samples of the pre-DFT sample sequence, and a<b<c<d, and the a, b, c and d satisfy: b−a=c−b=d−c. In an embodiment, if Group0 is located within $S_0$, $S_1$, which are the first and the second samples of the pre-DFT sample sequence, the a, b, c and d satisfy b=c−b=d−c.

If not all of the PTRS groups are of the same size, for another example, example 4: four PTRS groups are constructed: Group0, Group1, Group2, and Group3, and Group0 is located within $S_a$, $S_{a+1}$, $S_{a+2}$, which are the $a^{th}$, the $a+1^{th}$, and the $a+2^{th}$ samples of the pre-DFT sample sequence, Group1 is located within $S_b$, $S_{b+1}$, which are the $b^{th}$ and the $b+1^{th}$ samples of the pre-DFT sample sequence, Group3 is located within $S_c$, which is the $c^{th}$ sample of the pre-DFT sample sequence, Group4 is located within $S_d$, $S_{d+1}$, which are the $d-1^{th}$ and the $d^{th}$ samples of the pre-DFT sample sequence and a<b<c<d, and furthermore the a, b, and c and d satisfy b−a=c−b=d−c.

Also, the above embodiment may be combined with another embodiment of the processor 201. In example 1, because the PTRS group size is 2, the second sample of Group3 is the last PTRS sample within the pre-DFT sample sequence, and it is located at $S_{d+1}$ satisfying $S_{d+1}$<M−B, so that it is not placed within the last B samples of the pre-DFT sample sequence.

Similarly like in example 1, in example 2, $S_{d+1}$ satisfies $S_{d+1}$<M−B. The above embodiment may also be a single embodiment.

In another embodiment, the number of PTRS-groups is larger than two, and the absolute values of all the differences between all spacing between all pairs of consecutive PTRS-groups are smaller than the largest PTRS-group size.

For example, example 5: four PTRS groups are constructed: Group0, Group1, Group2, and Group3. When the PTRS group size K is 2, and the Group0 is located within $S_a$, $S_{a+1}$, which are the $a^{th}$ and the $a+1^{th}$ samples of the pre-DFT sample sequence, Group1 is located within $S_b$, $S_{b+1}$, which are the $b^{th}$ and the $b+1^{th}$ samples of the pre-DFT sample sequence, Group2 is located within $S_c$, $S_{c+1}$, which are the $c^{th}$ and the $c+1^{th}$ samples of the pre-DFT sample sequence, Group3 is located within $S_d$, $S_{d+1}$, which are the $d^{th}$ and the $d+1^{th}$ samples of the pre-DFT sample sequence and a<b<c<d, and the spacing between Group0 and Group1 is Spacing0=b−(a+1), the spacing between Group1 and Group2 is Spacing1=c−(b+1), the spacing between Group2 and Group3 is Spacing2=d−(c+1), then all the differences between each of the spacing involved are Difference0 and Difference1, wherein:

Difference0=Spacing1−Spacing0=(c−(b+1))−(b−(a+1));

Difference1=Spacing2−Spacing1=(d−(b+1))−(c−(b+1));

then in this embodiment the absolute value of Difference0 is smaller than K=2, and the absolute value of Difference1 is also smaller than 2. The above embodiment may also be a single embodiment.

In another embodiment, the B is smaller than a pre-defined value B1 and greater than a pre-defined value B2. It shall be noticed that the values of the parameters B1 and B2 are positive but need not necessarily be integers.

In another embodiment, value of B is larger than 1/250 times the size of the pre-DFT sample sequence and smaller than 1/4 times the size of the pre-DFT sample sequence.

In another embodiment, the apparatus is configured to construct at least two consecutive pre-DFT sample sequences, wherein at least one, in particular two, are having the last sample of the last PTRS-group placed at a pre-defined position located B samples before the end of the respective pre-DFT sample sequence.

In another embodiment, the PTRS is located within the $m_0^{th}$ sample to the $m_{15}^{th}$ sample of the pre-DFT sample sequence, wherein $m_0$ to $m_{15}$ take different values from Value0 to Value1 out of the following table1:

TABLE 1

| | |
|---|---|
| Value0 | 0 |
| Value1 | 1 |
| Value2 | 2 |
| Value3 | 3 |
| Value4 | $\frac{M}{4}+\left\lfloor\frac{M}{8}\right\rfloor-2$ |
| Value5 | $\frac{M}{4}+\left\lfloor\frac{M}{8}\right\rfloor-1$ |
| Value6 | $\frac{M}{4}+\left\lfloor\frac{M}{8}\right\rfloor$ |
| Value7 | $\frac{M}{4}+\left\lfloor\frac{M}{8}\right\rfloor+1$ |
| Value8 | $\frac{M}{2}+\left\lfloor\frac{M}{8}\right\rfloor-2$ |
| Value9 | $\frac{M}{2}+\left\lfloor\frac{M}{8}\right\rfloor-1$ |
| Value10 | $\frac{M}{2}+\left\lfloor\frac{M}{8}\right\rfloor$ |
| Value11 | $\frac{M}{2}+\left\lfloor\frac{M}{8}\right\rfloor+1$ |
| Value12 | Y-4 |
| Value13 | Y-3 |
| Value14 | Y-2 |
| Value15 | Y-1 | wherein M is the length of the pre-DFT sample sequence, and in the present embodiment Y=M−B.

In another embodiment, the PTRS is located within the $j_0^{th}$ sample to the $j_{15}^{th}$ sample of the pre-DFT sample sequence, wherein $j_0$ to $j_{15}$ take different values from Value0 to Value15 out of the following table2:

TABLE 2

| | |
|---|---|
| Value0 | 0 |
| Value1 | 1 |
| Value2 | 2 |
| Value3 | 3 |
| Value4 | $\frac{M'}{4}+\left\lfloor\frac{M'}{8}\right\rfloor-2$ |
| Value5 | $\frac{M'}{4}+\left\lfloor\frac{M'}{8}\right\rfloor-1$ |
| Value6 | $\frac{M'}{4}+\left\lfloor\frac{M'}{8}\right\rfloor$ |
| Value7 | $\frac{M'}{4}+\left\lfloor\frac{M'}{8}\right\rfloor+1$ |
| Value8 | $\frac{M'}{2}+\left\lfloor\frac{M'}{8}\right\rfloor-2$ |
| Value9 | $\frac{M'}{2}+\left\lfloor\frac{M'}{8}\right\rfloor-1$ |
| Value10 | $\frac{M'}{2}+\left\lfloor\frac{M'}{8}\right\rfloor$ |
| Value11 | $\frac{M'}{2}+\left\lfloor\frac{M'}{8}\right\rfloor+1$ |
| Value12 | W-4 |
| Value13 | W-3 |
| Value14 | W-2 |
| Value15 | W-1 | wherein M is the length of the pre-DFT sample sequence, and $$M' = 4 \times \left\lfloor\frac{M-B}{4}\right\rfloor,$$

and in the present embodiment W=M'.

As an embodiment, the apparatus further comprises:
Transmitter 202, configured to send the pre-DFT sample sequence to a receiver.

As another embodiment, the processor is further configured to map the pre-DFT sample sequence into a post-DFT sequence. The processor is further configured to map the post-DFT sequence onto a pre-IFFT sequence. The processor is further configured to map the pre-IFFT sequence into a post-IFFT sequence, and add a CP to the post-IFFT sequence to create an OFDM symbol. The transmitter 202 is configured to transmit the OFDM symbol.

As an embodiment, further comprises a receiver, configured to receive a message before the apparatus constructs the pre-DFT sample sequence, wherein the message comprises the B or a parameter associated with the value of B.

According to the present embodiment showed and described in FIG. 2, the apparatus ensures the receiver demodulates the PTRS in its correct place. Receiver timing offsets no longer affect the phase noise estimation process performed by the receiver, and measurement, estimation and tracking of phase noise become more accurate and effective, thus subsequently improving the performance of the wireless communication system.

Figure 3:
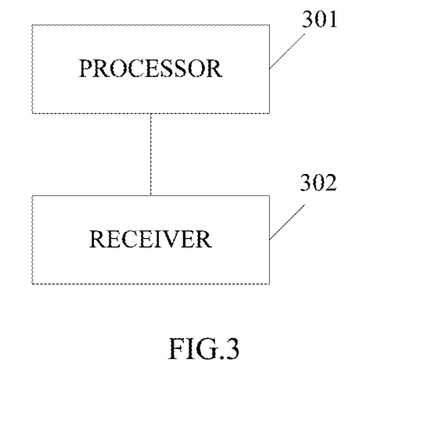
FIG. 3 is a structural diagram of an apparatus for the present invention.

FIG. 3 shows a structure of an apparatus for acquiring a post-IDFT sample sequence of an OFDM-signal, comprising:

a processor 301, configured to acquire a post-IDFT sample sequence with a pre-defined length;

and extract data and a PTRS-group, wherein the post-IDFT sample sequence is shifted by a distance smaller than or equal to B post-IDFT samples relative to the pre-DFT sample sequence generated at the transmitter which transmitted the OFDM-signal to the receiver.

As an embodiment, the structure of apparatus comprises a receiver 302, configured to receive a post-IDFT sample sequence which is shifted in post-IDFT TD or alternatively and equivalently in pre-IDFT FD relative to a pre-DFT sample sequence, which is generated at the transmitter apparatus.

As an embodiment, the processor extracts the post-IDFT sample sequence, determines the location of the PTRS groups in the post-IDFT sample sequence and then determines the PTRS in the PTRS groups and data.

In an embodiment, the processor further processes the post-IDFT sample sequence according to a cyclic shift, to determine a recovered sequence, wherein the order of samples in the recovered sequence is the same as their ordering in the pre-DFT sample sequence. The recovered signal has the same feature as described in FIG. 2, including Table1 and Table2. The details are not described herein again.

In another embodiment, the processor is further configured to extract at least two PTRS-groups, wherein these PTRS-groups are arranged with an equal spacing within the post-IDFT sample sequence. "Equal spacing" here means that the numbers of samples between pairs of consecutive PTRS groups are all the same, up to possible differences which are smaller or equal to the largest PTRS-group size. This embodiment is similar like the embodiment in FIG. 2, especially in Examples 1 to 5 in the embodiment of FIG. 2. The details are not described herein again.

In another embodiment, B is smaller than a pre-defined value B1 and is greater than a pre-defined value B2.

In another embodiment, the processor is further configured to:

acquire another post-IDFT sample sequence of an OFDM-signal, wherein a PTRS-group is used to estimate data of the another post-IDFT sample sequence; and/or wherein a PTRS-group from the another post-IDFT sample sequence is used to estimate the data.

In another embodiment, the value of B is larger than 1/250 times the size of the pre-DFT sample sequence and smaller than 1/4 times the size of the pre-DFT sample sequence.

According to present embodiment showed and described in FIG. 3, the apparatus demodulates the PTRS in its correct place. Receiving timing offsets no longer affect the estimation process performed by the receiver, and the quality and effectivity of the measurement, estimation and/or tracking of phase noise is improved.

Figure 4:
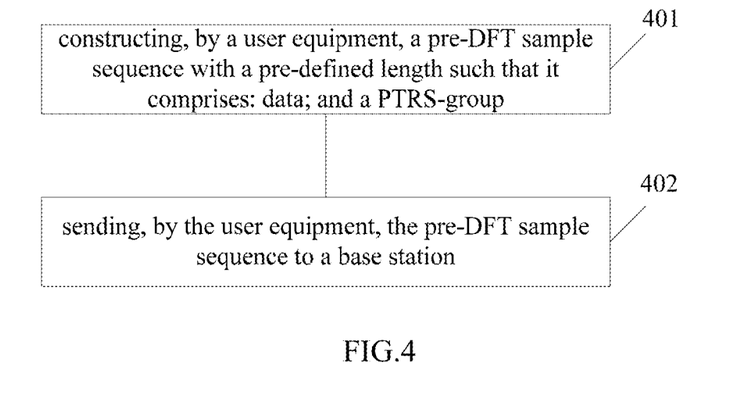
FIG. 4 is a flowchart of a method for the present invention.

FIG. 4 is a flowchart of a method embodiment for constructing a pre-DFT sample sequence for an OFDM-signal, comprising:

Step 401: constructing, by a user equipment, a pre-DFT sample sequence with a pre-defined length such that it comprises: data; and a PTRS-group, wherein the last sample of the PTRS-group is placed within the pre-DFT sample sequence at a pre-defined position located B samples before the end of the pre-DFT sample sequence.

In another embodiment, the number of PTRS-groups is larger than one, and then the last sample of the last PTRS-group is placed within the pre-DFT sample sequence at a pre-defined position located B samples before the end of the pre-DFT sample sequence.

The more PTRS groups in a pre-DFT sample sequence, the more accuracy in PN estimation or measurements by the receiver may be achieved. However, too many PTRS groups also may waste resources. As a result, the location of the PTRS groups shall be constructed or determined to increase the efficiently of PN estimation. In another embodiment, the number of PTRS-groups is larger than two and the PTRS-groups are arranged with an equal spacing within the pre-DFT sample set. "Equal spacing" here means that the numbers of samples between pairs of consecutive PTRS groups are all the same, up to possible differences which are smaller or equal to the largest PTRS-group size.

In another embodiment, the number of PTRS-groups is larger than two and the PTRS-groups are arranged with an equal spacing of start sample of each group within the pre-DFT sample set.

In another embodiment, the number of PTRS-groups is larger than two, and the absolute values of all the differences between all spacing between all pairs of consecutive PTRS-groups are smaller than the largest PTRS-group size.

In another embodiment, the B is smaller than a pre-defined value B1 and greater than a pre-defined value B2. It shall be noticed that the values of the parameters B1 and B2 are positive numbers which however need not necessarily be integers.

In another embodiment, value of B is larger than 1/250 times the size of the pre-DFT sample sequence and smaller than 1/4 times the size of the pre-DFT sample sequence.

In another embodiment, Step 401 comprising construct, by the user equipment, at least two consecutive pre-DFT sample sequences, wherein at least one, in particular two, having the last sample of a PTRS-group placed at a pre-defined position located B samples before the end of the respective pre-DFT sample sequence.

In another embodiment, the PTRS is located within the $m_0^{th}$ sample to the $m_{15}^{th}$ sample of the pre-DFT sample sequence, wherein $m_0$ to $m_{15}$ take different values from Value0 to Value1 out of the following table3:

TABLE 3

| | |
|---|---|
| Value0 | 0 |
| Value1 | 1 |
| Value2 | 2 |
| Value3 | 3 |
| Value4 | $\frac{M}{4} + \lfloor \frac{M}{8} \rfloor - 2$ |
| Value5 | $\frac{M}{4} + \lfloor \frac{M}{8} \rfloor - 1$ |
| Value6 | $\frac{M}{4} + \lfloor \frac{M}{8} \rfloor$ |
| Value7 | $\frac{M}{4} + \lfloor \frac{M}{8} \rfloor + 1$ |
| Value8 | $\frac{M}{2} + \lfloor \frac{M}{8} \rfloor - 2$ |
| Value9 | $\frac{M}{2} + \lfloor \frac{M}{8} \rfloor - 1$ |
| Value10 | $\frac{M}{2} + \lfloor \frac{M}{8} \rfloor$ |
| Value11 | $\frac{M}{2} + \lfloor \frac{M}{8} \rfloor + 1$ |
| Value12 | Y-4 |
| Value13 | Y-3 |
| Value14 | Y-2 |
| Value15 | Y-1 | wherein M is the length of the pre-DFT sample sequence, and in the present embodiment Y=M−B.

In another embodiment, the PTRS is located within the $j_0^{th}$ sample to the $j_{15}^{th}$ sample of the pre-DFT sample sequence, wherein $j_0$ to $j_{15}$ take different values from Value0 to Value15 out of the following table4:

TABLE 4

| | |
|---|---|
| Value0 | 0 |
| Value1 | 1 |
| Value2 | 2 |
| Value3 | 3 |
| Value4 | $\frac{M'}{4} + \lfloor \frac{M'}{8} \rfloor - 2$ |
| Value5 | $\frac{M'}{4} + \lfloor \frac{M'}{8} \rfloor - 1$ |

TABLE 4-continued

| | |
|---|---|
| Value6 | $\frac{M'}{4} + \left\lfloor \frac{M'}{8} \right\rfloor$ |
| Value7 | $\frac{M'}{4} + \left\lfloor \frac{M'}{8} \right\rfloor + 1$ |
| Value8 | $\frac{M'}{2} + \left\lfloor \frac{M'}{8} \right\rfloor - 2$ |
| Value9 | $\frac{M'}{2} + \left\lfloor \frac{M'}{8} \right\rfloor - 1$ |
| Value10 | $\frac{M'}{2} + \left\lfloor \frac{M'}{8} \right\rfloor$ |
| Value11 | $\frac{M'}{2} + \left\lfloor \frac{M'}{8} \right\rfloor + 1$ |
| Value12 | W-4 |
| Value13 | W-3 |
| Value14 | W-2 |
| Value15 | W-1 | wherein M is the length of the pre-DFT sample sequence, and $$M' = 4 \times \left\lfloor \frac{M-B}{4} \right\rfloor,$$

and in the present embodiment W=M−B.

As an embodiment, the method further comprises:

Step 402, sending, by the user equipment, the pre-DFT sample sequence to a base station.

As another embodiment, Step 402 includes mapping, by the user equipment map the pre-DFT sample sequence into a post-DFT sequence. The processor is further configured to map the post-DFT sequence onto a pre-IFFT sequence. The processor is further configured to map the pre-IFFT sequence into a post-IFFT sequence, and add a CP to the post-IFFT sequence to create an OFDM symbol. The transmitter 202 is configured to transmit the OFDM symbol.

As an embodiment, receiving, by the user equipment, a message before the apparatus construct the pre-DFT sample sequence, wherein the message comprises the B or parameter associated with the B.

According to the present embodiment shown and described in FIG. 4, the method ensures the receiver demodulates the PTRS in its correct place. Receiver timing offsets no longer affect the phase noise estimation process performed by the receiver, and measurement, estimation and tracking of phase noise become more accurate and effective, thus subsequently improving the performance of the wireless communication system. The embodiment of FIG. 4 corresponds to the embodiment of FIG. 2, whose embodiments, features or examples may be used as the method of FIG. 4 as well. In an embodiment of FIG. 4, the user equipment may be a base station, and the base station may correspondingly be a user equipment.

Figure 5:
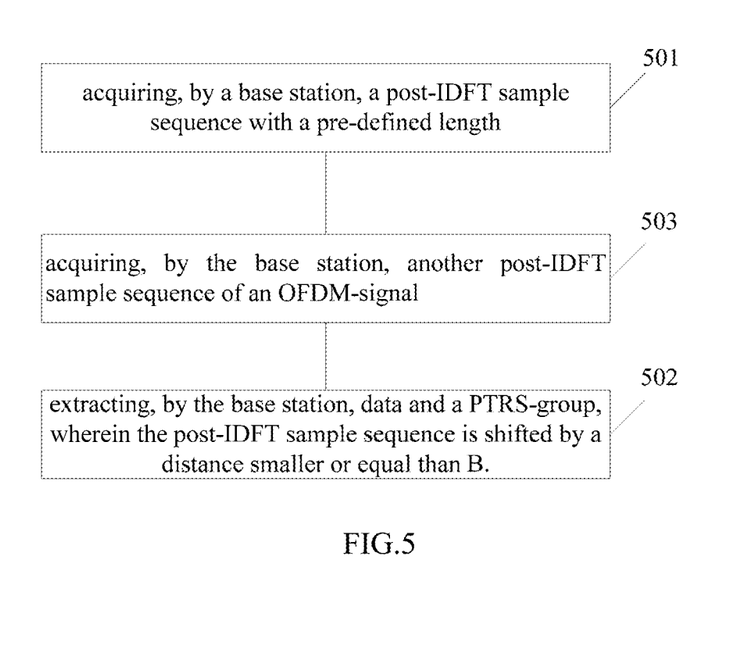
FIG. 5 is a flowchart of a method for the present invention.

FIG. 5 shows a flowchart of method for acquiring a post-IDFT sample sequence of an OFDM-signal, comprising:

Step 501, acquiring, by a base station, a post-IDFT sample sequence with a pre-defined length;

Step 502, extracting, by the base station, data and a PTRS-group, wherein the post-IDFT sample sequence is shifted by a distance smaller than or equal to B post-IDFT samples relative to the pre-DFT sample sequence generated at the transmitter which transmitted the OFDM-signal to the receiver.

In an embodiment, including Step 502: before Step 501, receiving, by the base station, a post-IDFT sample sequence which is shifted in post-IDFT TD or alternatively and equivalently in pre-IDFT FD relative to a pre-DFT sample sequence, which was generated at the transmitter apparatus.

As an embodiment, extracting, by the base station the post-IDFT sample sequence, determining, by the base station, the location of the PTRS-groups in the post-IDFT sample sequence and then determining, by the base station, the PTRS in the PTRS-groups and data.

In an embodiment, the base station further processes the post-IDFT sample sequence according to a cyclic shift, to determine a recovered sequence, wherein the order of samples in the recovered sequence is the same as their ordering in the pre-DFT sample sequence. The recovered signal has the same feature described in FIG. 2, including Table1 and Table2. Details are not described herein again.

In one embodiment, Step 502 comprising extracting, by the base station, at least two PTRS-groups, wherein these PTRS-groups are arranged with an equal spacing within the post-IDFT sample sequence. "Equal spacing" here means that the numbers of samples between pairs of consecutive PTRS groups are all the same, up to possible differences which are smaller or equal to the largest PTRS-group size. This embodiment is similar like the embodiment in FIG. 2, especially in Examples 1 to 5 in the embodiment of FIG. 2 details are not described herein again.

In another embodiment, B is smaller than a pre-defined value B1 and greater than a pre-defined value B2.

In another embodiment, the method is further configured to:

Step 503: acquiring, by the base station, another post-IDFT sample sequence of an OFDM-signal, wherein a PTRS-group is used to estimate data of the another post IDFT sample sequence; and/or wherein a PTRS-group from the another post-IDFT sample sequence is used to estimate the data.

In another embodiment, the value of B is larger than $\frac{1}{250}$ times the size of the pre-DFT sample sequence and smaller than $\frac{1}{4}$ times the size of the pre-DFT sample sequence.

According to present embodiment showed and described in FIG. 5, the apparatus demodulates the PTRS in its correct place. Receiver timing offsets no longer affect the phase noise estimation process performed by the receiver, and measurement, estimation and tracking of phase noise become more accurate and effective, thus subsequently improving the performance of the wireless communication system. In embodiment of FIG. 5, the base station may be a user equipment, and the user equipment may correspondingly be a base station.

Figure 6:
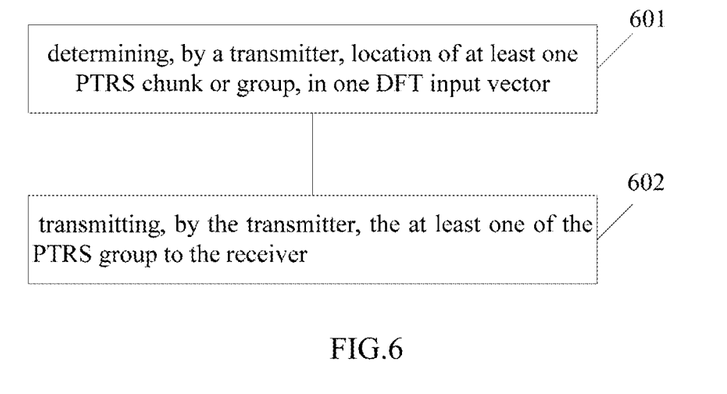
FIG. 6 is a flowchart of a method for the present invention.

FIG. 6 is another flowchart of a method embodiment of sending a reference signal. In FIG. 6, the DFT input vector is equivalent to a pre-DFT sample sequence in the previous embodiments, and an element is equivalent to a pre-DFT sample. Comprising:

Step 601, determining, by a transmitter, location of at least one PTRS group, in one DFT input vector; wherein the last element of the DFT input vector contains no PTRS signal.

As an embodiment, the DFT input vector is of length M, and there are X PTRS groups in the DFT input vector. As an embodiment, each one of the PTRS groups is of the same size K.

Figure 7:
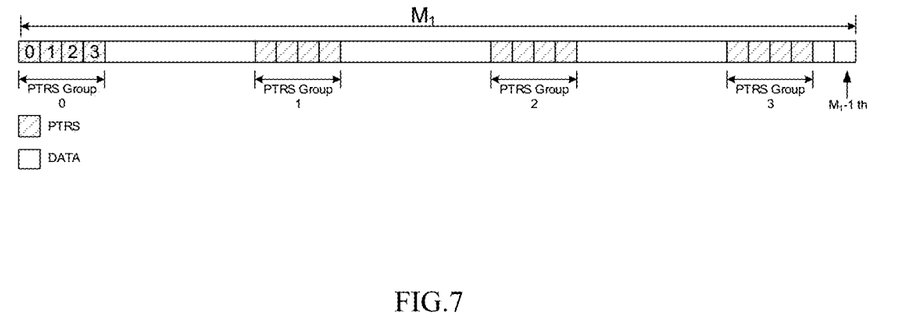
FIG. 7 is a diagram of PTRS-groups as located in a pre-DFT sample sequence for the present invention.

FIG. 7 shows a diagram of a PTRS group as located in the DFT input vector. The vector length is $M_1$ or the number of elements is $M_1$, and the elements are indexed by the integers from 0 through $M_1-1$, inclusive. The PTRS group is of size 4, i.e., K=4, and there are 4 PTRS groups in the DFT input vector. The last element of the DFT input vector, namely the element indexed by ($M_1-1$), contains no PTRS signal.

To ensure that the order of the PTRS samples within the post-IDFT sample sequence acquired by the receiver is not different from the order of the corresponding PTRS samples within the pre-DFT sample sequence as generated by the transmitter, PTRS samples may not be located in the last one or several elements of the DFT input vector. In an embodiment, the spacing between the last element of the last PTRS group and the last element of the DFT input vector is B, wherein B is a positive integer. As an embodiment, the value of B is determined by one of the receive apparatus or transmit apparatus, or the B is a pre-defined number. In another embodiment, the value of B depends on the length of the cyclic prefix, CP, of the OFDM signal and/or B depends on a scale factor z, wherein the scale factor is determined by one of the receive apparatus or transmit apparatus or takes a pre-defined value. In another embodiment, B satisfies B=z·C, wherein C is the duration of the CP in units of 1/M of the net OFDM symbol length. In another embodiment, B satisfies one of the following: B=round(z·C), or B=⌈z·C⌉, or B=⌊z·C⌋, wherein z is scale factor and z satisfies z∈(0, 1], ⌊•⌋ denotes the round-down to the nearest smaller or equal integer (or floor) operation, ⌈•⌉ denotes the round-up to the nearest larger or equal integer (or ceiling) operation, and round(•) denotes the rounding operation to the nearest integer, and C is as defined above. In an embodiment, C satisfies C=$\tau_{cp}$·M, wherein $\tau_{cp}$ is the CP fractional size, as an example, $\tau_{cp}$=9/128 in normal CP duration mode of or $\tau_{cp}$=1/4 in extended CP duration mode.

For the following embodiments, two cases of different numbers of PTRS groups X will be separately introduced as two embodiments. The two embodiments may be combined, or separately implemented.

Case 1: X=2.

In this embodiment, two PTRS groups are located in the DFT input vector, and each PTRS group consists of K PTRS samples. Denote by $i_0$ is the start element index of the first PTRS group, and denote by $i_1$ is the start element of the second PTRS group, wherein $i_0$ and $i_1$ satisfy:

$i_0=0$ $i_1=M'-K$ wherein M'=M-B; wherein M is the length of the DFT input vector and B is determined as in one of the embodiments above.

Case 2: X is larger than 2.

In embodiments in this case, more than two PTRS groups are located in the DFT input vector, and each PTRS group consists of K PTRS samples.

In one embodiment, the start samples of at least two consecutive PTRS groups are placed P samples apart within the input DFT vector, where P is a positive number larger than K and smaller than M/2. This embodiment may be an independent embodiment.

Denoting by X the number of PTRS groups in the pre-DFT input vector, by $i_0$ the start element of the first PTRS group, by $i_1$ the start element of the second PTRS group, and so on, denoting by $i_x$ is the start element number of $(x-1)^{th}$ PTRS group, wherein x runs from 0 to X-1, the following schemes of determining the position of the start samples of the PTRS groups within the pre-DFT input vector describe different embodiments when X>2.

In Scheme 1, $i_0$ to $i_{X-1}$ satisfy:

$$i_x = \begin{cases} 0 & x=0 \\ \lfloor(2x+1)M/(2X)\rfloor - \lfloor K/2 \rfloor & x=1,2,K, \text{ where } M'=M-B \\ M'-K & X-2, \\ & x=X-1 \end{cases} \quad \text{Scheme 1}$$

In Scheme 2, $i_0$ to satisfy:

$$i_x = \begin{cases} 0 & x=0 \\ \lfloor(2x+1)M'/(2X)\rfloor - \lfloor K/2 \rfloor & x=1,2,K, \text{ where } M'=M-B \\ M'-K & X-2, \\ & x=X-1 \end{cases} \quad \text{Scheme 2}$$

In Scheme 2a, $i_0$ to $i_{X-1}$ satisfy:

$$i_x = \begin{cases} 0 & x=0 \\ xM'/X + \lfloor M'/ \rfloor & x=1,2,K, \text{ where } M'=X \\ (2X)\rfloor - \lfloor K/2 \rfloor & X-2, \quad \lfloor(M-B)/X\rfloor \\ M'-K & x=X-1 \end{cases} \quad \text{Scheme 2a}$$

In Scheme 3, $i_0$ to $i_{X-1}$ satisfy:

$$i_x = \begin{cases} 0 & x=0 \\ \lfloor(xM'/(X-1))\rfloor - & x=1,2,K, \text{ where } M'=M-B \\ \lfloor K/2 \rfloor & X-2, \\ M'-K & x=X-1 \end{cases} \quad \text{Scheme 3}$$

In Scheme 3a, $i_0$ to $i_{X-1}$ satisfy:

$i_x=x\Delta$ for $x=0,1,K,X-1$, where $\Delta=\lfloor M'/(X-1)\rfloor$, $M'=M-B-K$     Scheme3a:

In Scheme 4, $i_0$ to $i_{X-1}$ satisfy:

$i_x=x\Delta+n$ for $x=0,1,K,X-1$, where $\Delta=\lfloor M'/X \rfloor$, $M'=M-B$, and $0 \leq n \leq \Delta-K$     Scheme4:

In Scheme 5, $i_0$ to $i_{X-1}$ satisfy:

$i_x = x\Delta + n$ for $x = 0, 1, K, X-1$,     Scheme 5 where $\Delta = \min\left(\text{round}\left(\frac{M+C}{X}\right), \left\lfloor \frac{M'-K}{X-1} \right\rfloor\right)$, $M' = M - B$, and $0 \leq n \leq M' - (X-1)\Delta - K$.

wherein M is the length of the DFT input vector and B is determined as in one of the embodiments above, and n in Schemes 4 and 5 is an integer satisfying the respective condition. In an embodiment, n is a number determined by one of the receive apparatus or transmit apparatus or is a pre-defined value.

As a combined embodiment of Case 1 and Case 2, the start samples $i_0$ and $i_1$ satisfy $$i_0 = 0$$

$$i_1 = M' - K$$

when X=2, and $i_x$ is determined according to one of the Schemes 1, 2, 2a, 3, 3a, 4, or 5 when X>2, e.g., when X=4.

Step 602, transmitting, by the transmitter, the at least one of the PTRS group to the receiver.

According to present embodiment showed and described in FIG. 6, the apparatus demodulates the PTRS in its correct place. Receiver timing offsets no longer affect the phase noise estimation process performed by the receiver, and measurement, estimation and tracking of phase noise become more accurate and effective, thus subsequently improving the performance of the wireless communication system.

Figure 8:
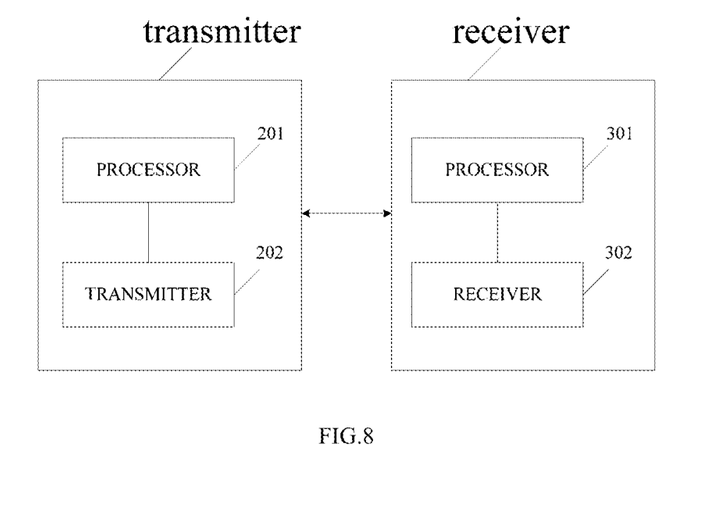
FIG. 8 is a system structure for the present invention.

FIG. 8 shows a system structure of an embodiment, comprising a transmitter showed in embodiment of FIG. 2, and a receiver showed in embodiment of FIG. 3. The transmitter and the receiver are connected via an air interface, to complete communication between each other.

When the foregoing integrated unit is implemented in a form of a software functional unit, the integrated unit may be stored in a computer-readable storage medium. The software functional unit is stored in a storage medium and includes several instructions for instructing a computer device (which may be a personal computer, a server, or a network device) to perform a part of the steps of the methods described in the embodiments of the present invention. The foregoing storage medium includes: any medium that can store program code, such as a USB flash drive, a removable hard disk, a read-only memory (ROM), a random access memory (RAM), a magnetic disc, or an optical disc.

Finally, it should be noted that the foregoing embodiments are merely intended for describing the technical solutions of the present invention other than limiting the present invention. Although the present invention is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of the present invention.

What is claimed is:

1. An apparatus for constructing a pre-discrete Fourier transform (DFT) sample sequence for an orthogonal frequency division multiplexing (OFDM)-signal, the apparatus comprising:
   a processor configured to:
   construct the pre-DFT sample sequence with a pre-defined length such that it comprises:
   data; and
   a plurality of phase tracking reference signal (PTRS)-groups,
   wherein samples in the pre-DFT sample sequence are ordered in one on one correspondence with time ticks along a transmitted signal time axis, wherein a distance between consecutive time ticks is equal to a net OFDM symbol duration divided by a size of the pre-DFT sample sequence,
   wherein the last sample of the plurality of PTRS-groups are placed within the pre-DFT sample sequence at a pre-defined position located B samples before the end of the pre-DFT sample sequence, and
   enable an intra-symbol phase noise interpolation with a single linear interpolation filter over PTRS-groups from among the plurality of PTRS-groups which are placed uniformly within an OFDM symbol.

2. The apparatus according to claim 1, wherein the pre-DFT sample sequence comprises more than two PTRS-groups and the PTRS-groups are arranged with an equal spacing within the pre-DFT sample sequence.

3. The apparatus according to claim 1, wherein B is smaller than a pre-defined value B1 and/or greater than a pre-defined value B2.

4. The apparatus according to claim 1, wherein the value of B is larger than 1/250 times the size of the pre-DFT sample sequence and smaller than 1/4 times the size of the pre-DFT sample sequence.

5. The apparatus according to claim 1, wherein the processor is configured to construct at least two consecutive pre-DFT sample sequences having a PTRS-group located at a pre-defined position located B samples before the end of the respective pre-DFT sample sequence.

6. A method for constructing a pre-discrete Fourier transform (DFT) sample sequence for an orthogonal frequency division multiplexing (OFDM)-signal, comprising:
   constructing, by a user equipment, the pre-DFT sample sequence with a pre-defined length such that it comprises:
   data; and
   a plurality of phase tracking reference signal (PTRS)-groups,
   wherein samples in the pre-DFT sample sequence are ordered in one on one correspondence with time ticks along a transmitted signal time axis, wherein a distance between consecutive time ticks is equal to a net OFDM symbol duration divided by a size of the pre-DFT sample sequence,
   wherein the last sample of the plurality of PTRS-groups is located within the pre-DFT sample sequence at a pre-defined position located B samples before the end of the pre-DFT sample sequence, and
   enabling an intra-symbol phase noise interpolation with a single linear interpolation filter over PTRS-groups from among the plurality of PTRS-groups which are placed uniformly within an OFDM symbol.

7. The method according to claim 6, wherein the pre-DFT sample sequence comprises more than two PTRS-groups and the PTRS-groups are arranged with an equal spacing within the pre-DFT sample sequence.

8. The apparatus according to claim 6, wherein B is smaller than a pre-defined value B1 and/or greater than a pre-defined value B2.

* * * * *